United States Patent [19]

Jetzt et al.

[11] 3,725,601

[45] Apr. 3, 1973

[54] DIRECT STATION SELECTION PRIVATE INTERCOM EXCHANGE SYSTEM

[75] Inventors: John J. Jetzt, Lincroft; John Charles Sullivan, Shrewsbury, both of N.J.

[73] Assignee: Bell Telephone Laboratories, Incorporated, Murray Hill, N.J.

[22] Filed: Mar. 5, 1971

[21] Appl. No.: 121,398

[52] U.S. Cl. ....................179/99, 179/38, 179/18 BC

[51] Int. Cl. ....................H04m 1/70

[58] Field of Search .........179/38, 99, 27 CA, 39, 30, 179/18 BC, 1 CN

[56] References Cited

UNITED STATES PATENTS

| | | | |
|---|---|---|---|
| 2,845,492 | 7/1958 | Kaye et al. | 179/99 |
| 3,271,524 | 9/1966 | Allen et al. | 179/27 CA |
| 3,384,717 | 5/1968 | Coston | 179/27 CA |
| 3,385,935 | 5/1968 | Anderson et al. | 179/99 |
| 2,741,667 | 4/1956 | Schneider et al. | 179/39 |

*Primary Examiner*—Kathleen H. Claffy
*Assistant Examiner*—Thomas L. Kundert
*Attorney*—R. J. Guenther and Edwin B. Cave

[57] ABSTRACT

A group of modified key telephone station sets is uniquely interconnected with substantially conventional key telephone equipment to provide a number of PBX-like functions. Each station set is provided with a privacy circuit which under all conditions prevents a station from gaining access to any line already in use.

10 Claims, 6 Drawing Figures

INVENTORS J. J. JETZT
J. C. SULLIVAN
BY
ATTORNEY

DIRECT STATION SELECTION PRIVATE INTERCOM EXCHANGE SYSTEM

BACKGROUND OF THE INVENTION

1. Field of the Invention

This invention relates to key telephone systems and to private branch exchange telephone systems and, more particularly, to systems that, in part, provide functions of both.

2. Description of the Prior Art

Private branch exchanges (PBX) and key telephone systems serve at least one common function in that both provide a switching interface between a number of telephone lines and a greater number of individual telephone station sets. In a PBX, however, the switching is all accomplished by common equipment, whereas in a key system certain switching functions, e.g., pushbutton selection of individual lines, is accomplished at the individual telephone set. Beyond this basic distinction, a PBX typically includes a number of features and operating modes that are not available in a conventional key system including, for example, add-on conferencing, complete privacy of all calls whether outside line calls or intercom calls, and individual call transfer. Unfortunately, however, with prior art equipment the telephone customer is not provided with a realistic choice between systems based primarily on the particular features desired. Instead, the choice must be based largely on the size of the system — the number of individual telephone sets to be served — since a PBX is prohibitively expensive when used for systems of less than 20 stations. In very large systems, the problem indicated does not really exist since a key system can be employed in conjunction with a PBX, making available at moderate cost all the advantages and functions of both.

With respect to the feature of call privacy, there are prior art privacy arrangements that can be adapted to key system use. These arrangements are generally unsatisfactory, however, in that under various circumstances privacy can be breached, allowing third-party connection to an original two-party call. Such circumstances include relatively common situations involving sudden voltage surges that may be caused for example by dialing pulses, by switchhook manipulation and by momentary battery removals.

Accordingly, an object of the invention is to increase the versatility of key telephone systems without a substantial increase in cost.

Another object is to improve the performance of call privacy circuits for key telephone systems.

SUMMARY OF THE INVENTION

The foregoing objects and additional objects are achieved in accordance with the principles of the invention by a telephone system that provides a PBX-type service with apparatus that includes modified key telephone sets uniquely interconnected with standard key telephone equipment. Cost is kept low by using distributed electronics in the station sets and a minimum of shared equipment.

Each set includes a field of pushbutton switches, some of which mark the appearance of the outside lines available to the system and others of which mark the appearance of intercom lines. Direct station selection (DSS) is employed for intercom calls and a separate intercom line is provided from every set to each of the other sets. One additional pushbutton switch provides access to an intercom ANSWER line, the line that links each set to the line of an incoming intercom call.

In accordance with one feature of the invention, the shared equipment is interconnected with the station sets in a manner that allows trading an outside line for an intercom line, or vice versa, by means of a simple strapping option in the station set and by changing a plug-in key telephone unit (KTU) in the common equipment. No wiring changes are required in the common equipment, however.

Another feature of the invention deals with a privacy circuit that ensures absolute call privacy whether the call is made on an outside line or on an intercom line. By a unique system of timing delay circuits, the privacy circuit precludes access to a busy line under any circumstances and additionally gives a visual indication that a line is busy when access is attempted.

An additional feature of the invention concerns a conferencing arrangement in which conferencing is provided at the station set by a switch that operates to complete a capacitive coupling between the appearance of the line to be added and the intercom ANSWER line.

GENERAL DESCRIPTION

Figure 1:
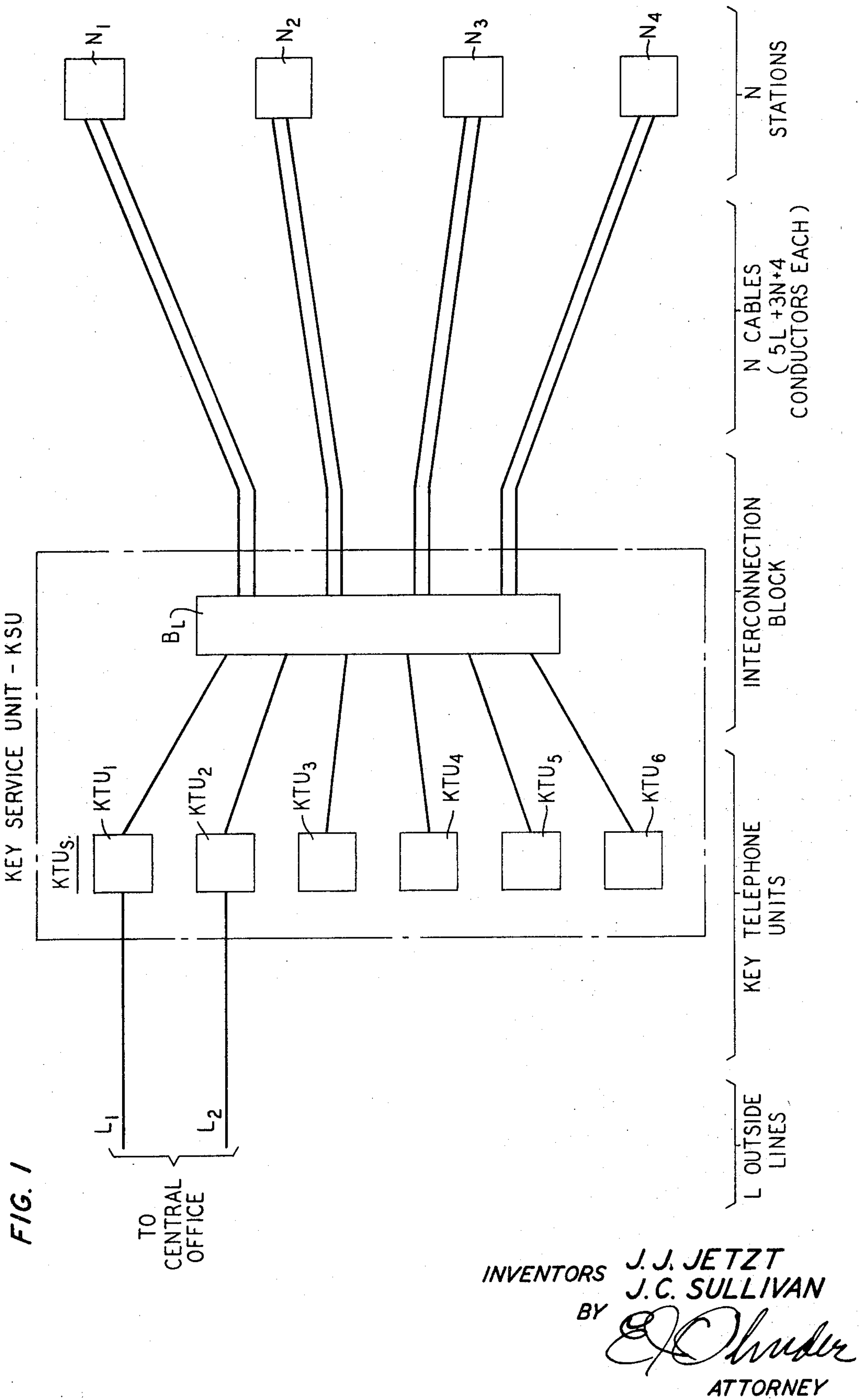
FIG. 1 is a simplified block diagram of a key telephone system in accordance with the invention.

As shown in FIG. 1, a system in accordance with the invention comprises a plurality of N key telephone station sets, in this instance $N_1$ through $N_4$, connected to an interconnection block $B_L$ in a key service unit KSU. The key service unit KSU additionally includes a local power supply, not shown, and a group of key telephone units KTU comprising units $KTU_1$ through $KTU_6$. The key telephone units $KTU_1$ and $KTU_2$ may be conventional line circuits of the type shown in United States Patent 3,436,488 issued to R. E. Barbato and D. T. Davis on Apr. 1, 1969. These units effect connections to the L outside lines $L_1$ and $L_2$, respectively. Each of the units $KTU_3$ through $KTU_6$ is a manual intercom line circuit or the type conventionally used in key telephone systems. It places the local talking battery on a local tip and ring pair that are then multipled to the appropriate station sets $N_1$ through $N_4$. Each of the KSU-station set cables employs a total of 5L+3N+4 conductors.

Figure 2:
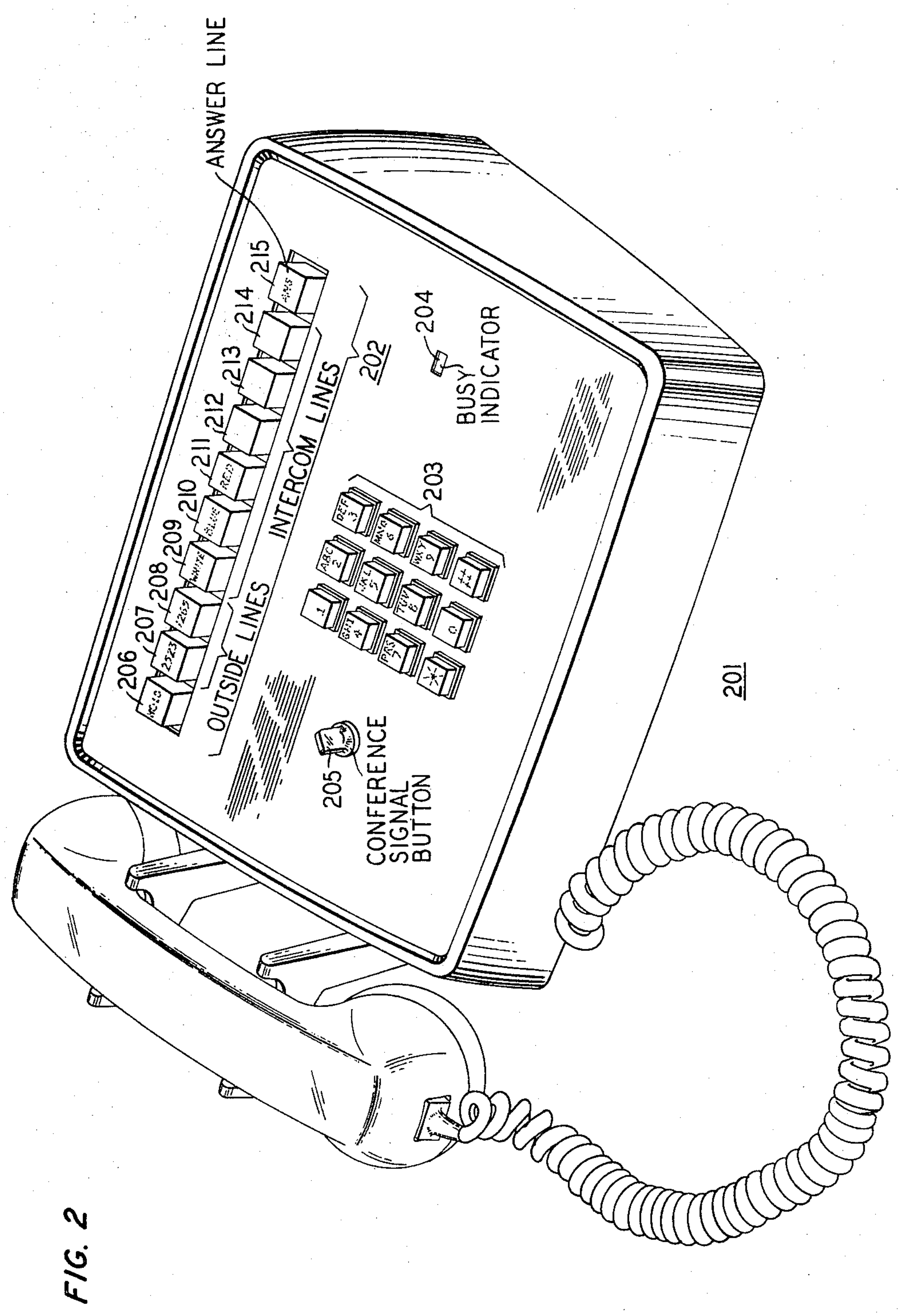
FIG. 2 is a sketch of an individual key telephone set of the type used in the system shown in FIG. 1.

The station set 201 of FIG. 2 is a modified multibutton key set shown with a pushbutton dial 203. Alternatively, however, a conventional rotary dial may be employed. The button field 202 includes a total of ten buttons, 206 through 215. Button 206 is a conventional HOLD button, buttons 207 and 208 are outside line buttons for connecting the set to outside lines such as $L_1$ and $L_2$ of FIG. 1, and the remaining buttons 209 through 215 are intercom buttons with button 215 serving as an intercom ANSWER button. Modifications required to render a multi-button key set suitable for use in a system in accordance with the invention include: a privacy circuit (FIG. 5), a busy indicator lamp 204 (FIG. 2), a conference signal button 205, and a buzzer (FIG. 2). The pushbutton dial 203 is conventional.

Figure 3:
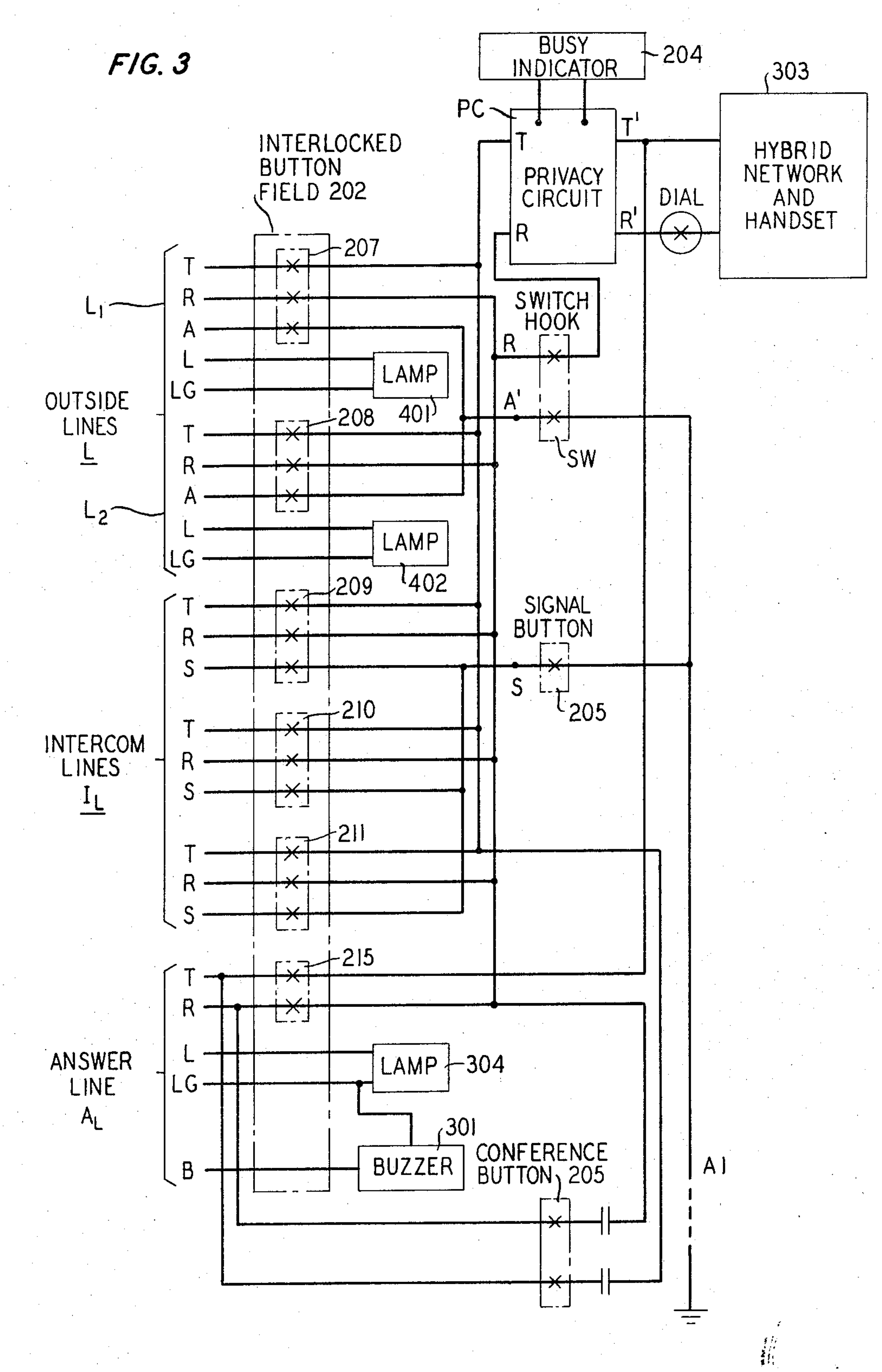
FIG. 3 is a combination block and schematic circuit diagram of the set shown in FIG. 2.

The simplified schematic diagram of FIG. 3 showing the modifications indicated above includes only six buttons to enhance clarity of description. It should be pointed out, however, that the inventive concepts disclosed herein may be expanded to any size key field although a total of twenty keys is considered to be the maximum that would be employed. If more than twenty lines are required, the use of a small PBX would have to be considered as a possibly more practical alternative. The HOLD button 206 of FIG. 2 is not shown in FIG. 3 inasmuch as it is used and wired in a wholly conventional manner. The other interlocked buttons in the key field, however, are wired in three different ways. In the case of the ANSWER button 215, the ring lead R is switched to terminal R of the privacy circuit PC but the tip lead T is switched to terminal T' of the privacy circuit PC, thereby bypassing that circuit. When a convertible outside-intercom button, such as button 208 for example, is wired for use as an outside line, it switches the A conductor to terminal A', and when wired for use as an intercom line it switches the S conductor to a terminal S. Accordingly, if wiring following the principles of the invention is employed, a simple strapping operation may be used to convert an outside line button to an intercom button.

Figure 5:
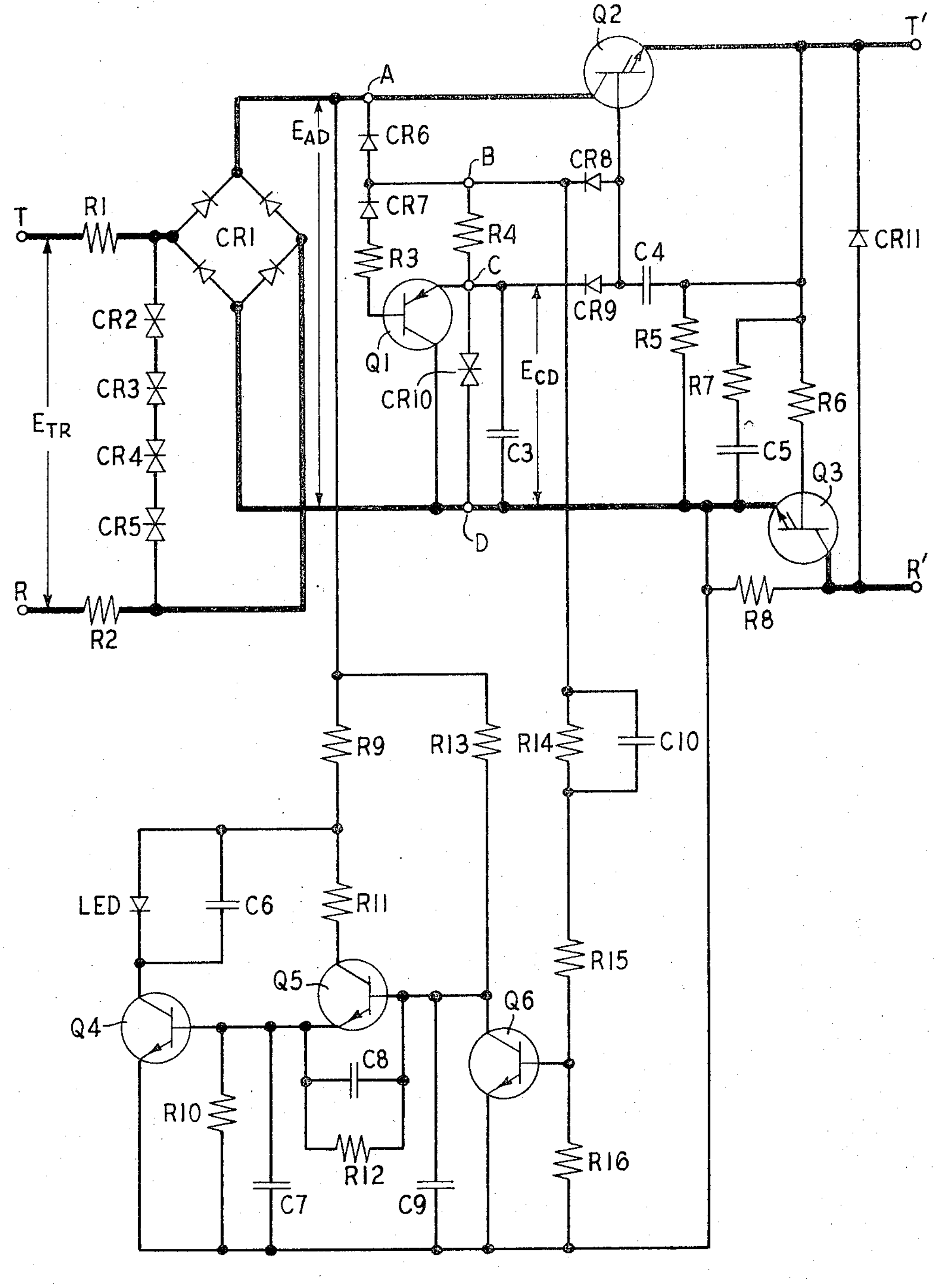
FIG. 5 is a schematic circuit diagram of a privacy circuit shown in block form in FIG. 3.

The privacy circuit PC is shown in FIG. 3 situated between terminals T and R and T' and R'. As indicated above, the purpose of the privacy circuit PC is to prevent a party from gaining access to any line, whether outside or intercom, that is already in use, thereby ensuring complete privacy on all two-party calls. The privacy circuit has two states, namely: "-fired" or conducting, and "off" or nonconducting. In the fired state, terminal T is connected to terminal T' and terminal R is connected through to terminal R' thus completing the talking path through to the hybrid network and handset 303. In the off state, the T–T' connection and the R–R' connection are broken so that the talking path is open on both sides of the line. The privacy circuit PC fires only when the station set goes off-hook on a line that is not already in use; otherwise it remains in the off state. The busy indicator 204 is a lamp on the base of the station set, as shown in FIG. 2. When the station set has gone off-hook on a line that is already in use, the privacy circuit PC does not fire, but the lamp 204 is activated, giving a visual indication to the user that the line is busy. The privacy circuit PC and the circuit for the busy indicator 204, which are shown in detail in FIG. 5, are more fully described under the subsequent heading, "Privacy Circuit."

The signal button 205 shown in FIG. 2 and illustrated by a block in FIG. 3 is employed for intercom signaling. It is a momentary push-to-make contact that connects terminal S (FIG. 3) to the grounded A1 lead, causing the lamp 304 in the called party's ANSWER button to glow as well as causing a buzzer 301 to sound. The conference button may advantageously be incorporated mechanically into the signal button 205. The conference portion is a turn-to-lock button which capacitively couples the ANSWER line $A_L$ around the key field. A conference may be formed between the ANSWER line $A_L$ and any other line whose button in the key field is depressed. The buzzer 301 is a standard intercom buzzer and is used to indicate an incoming intercom call.

Figure 4:
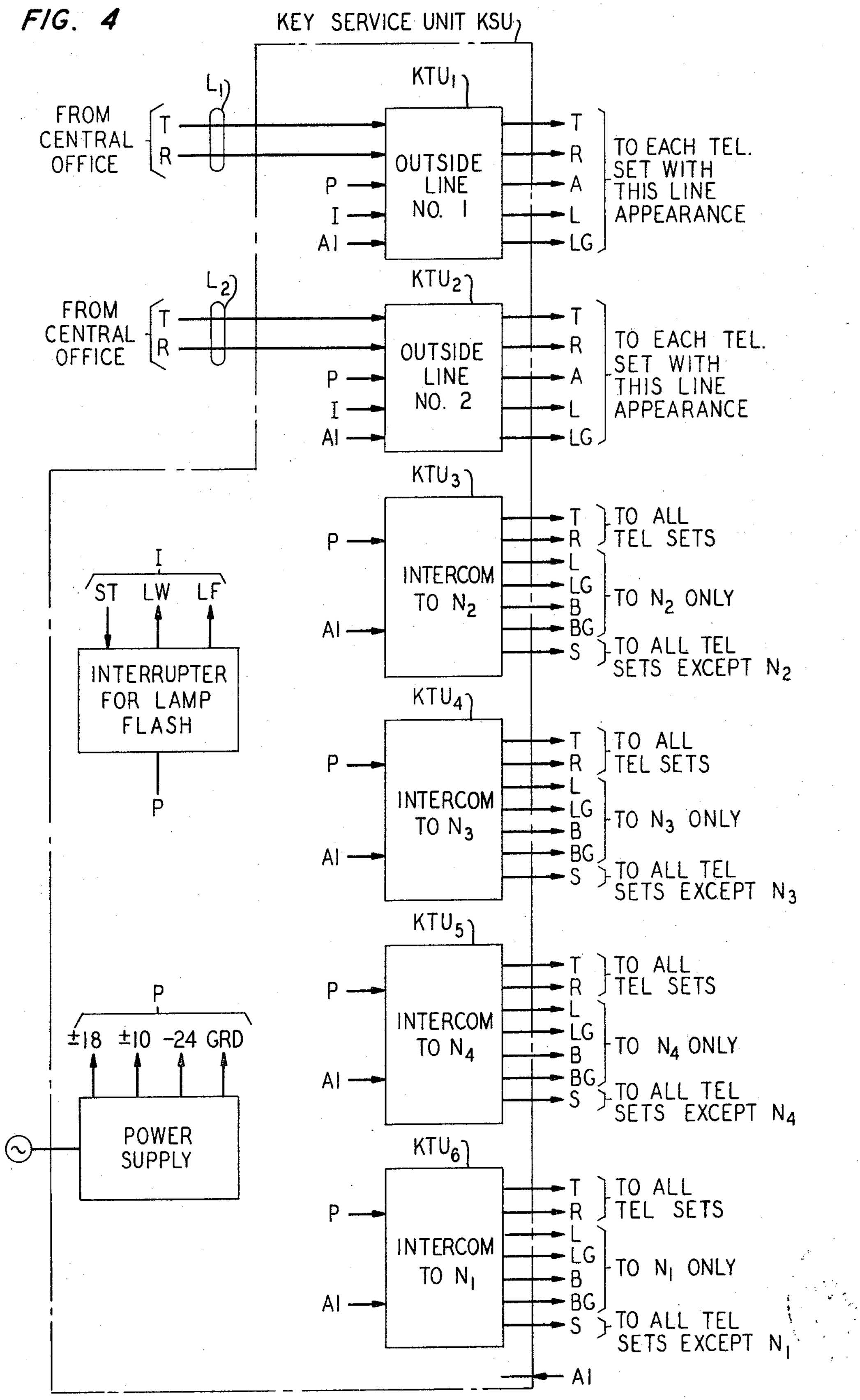
FIG. 4 is a more detailed version of the common portion of the system shown in FIG. 1.

Additional details of a single station set $N_1$ and its interconnection with the common equipment of a key service unit KSU are shown in FIG. 4. As indicated above, the elements of the KSU are substantially conventional; the interconnections employed, however, are unique. The tip and ring conductors of the outside lines $L_1$ and $L_2$ enter the respective line circuits $KTU_1$ and $KTU_2$ from a central office (not shown). From the key telephone unit or line circuit a control lead A, a ground return lead A1 and the lamp leads L and LG are all multiplied to the station sets that have access to that outside (or PBX) line. Each line circuit ($KTU_1$ or $KTU_2$) also includes a ringing detector (not shown) across tip and ring, and a hold circuit (not shown) which is activated by the A lead. Each line circuit ($KTU_1$ or $KTU_2$) connects either steady (ST), flashing (LF), or winking (LW) current to the lamp leads, as indicated by the interrupter block I, to signal that the line is in use, is being rung or is on HOLD, respectively.

The line circuits $KTU_3$, $KTU_4$, $KTU_5$ and $KTU_6$ are also conventional and are used in a commercially available key telephone system designated 1A2 which is illustrated in U.S. Pat. No. 3,239,610 issued Mar. 8, 1966 to C. E. Morse and J. P. Smith. This type of line circuit places a local talking battery P on a local tip and ring pair that are then multipled to the appropriate station sets. An S lead which is the A lead in certain prior art systems, is also multipled to the sets which is employed to control a relay (not shown). The relay is used to activate the lamp 304 and the buzzer 301 when a station is called on the intercom. This arrangement is accomplished by the wiring modification associated with the intercom lines' A leads as described above.

The local power supply P requires a 24 volt B battery for the operation of the KTUs, a 24 volt talking battery to power the intercom lines, a 10 volt a.c. lamp supply and an 18 volt a.c. buzzer supply.

A substantially conventional interruptor I is connected to the power supply 10 volt a.c. output to provide the lamp flash and wink currents. An interruptor typically employs a motor driven cam (not shown) which mechanically opens several contacts to produce the proper flash and wink intervals.

With further reference to FIG. 4, each station set such as set $N_1$ may be considered to be divided into complements or sets of conductors. There is one complement from each button, except the HOLD button, which is not shown, on the interlocked key field. The complements from the outside line buttons 207 and 208 include five conductors: tip T, ring R, an A lead, a lamp lead L and a lamp ground LG, all of which are terminated at the $KTU_1$ and $KTU_2$ line circuits. The complements from each of the intercom buttons 209, 210 and 211 include three conductors: tip T, ring R and an S or signal lead. In each case these three leads terminate at a respective one of the intercom line circuits $KTU_3$, $KTU_4$, $KTU_5$ or $KTU_6$. The complement from the ANSWER button 215 contains six leads: tip T, ring R, lamp L, lamp ground LG, buzzer B and buzzer ground BG. There is also one A1 or ground conductor in a cable which terminates on all six of the KTUs.

The following table lists the cable complements, the number assignment of each cable complement corresponding to its button assignment on the station sets.

| KTU | Function | Cable Complements Set $N_1$ | Set $N_2$ | Set $N_3$ | Set $N_4$ |
|---|---|---|---|---|---|
| $KTU_1$ | Outside Line No. 1 | $L_1$ | $L_1$ | $L_1$ | $L_1$ |
| $KTU_2$ | Outside Line No. 2 | $L_2$ | $L_2$ | $L_2$ | $L_2$ |
| $KTU_3$ | Intercom To $N_2$ | 215 | 209 | 209 | 209 |
| $KTU_4$ | Intercom To $N_3$ | 209 | 215 | 210 | 210 |
| $KTU_5$ | Intercom To $N_4$ | 210 | 210 | 215 | 211 |
| $KTU_6$ | Intercom To $N_1$ | 211 | 211 | 211 | 215 |

Common audible ringing may also be wired into the system. For this purpose a diode matrix block may be connected with the outside line circuits $KTU_1$ and $KTU_2$ and separate ringing pairs run in the cables to the appropriate station sets. It is also possible, with a simple wiring modification, to have common audible ringing serve for the intercom signaling in lieu of the buzzer.

System Operation

The operation of a system in accordance with the invention is described below with particular reference to FIG. 4 in terms of the various operating modes which include: placing an outside call, receiving an outside call, holding an outside call, transferring an outside call to another station, placing an intercom call, receiving an intercom call, and forming a conference call.

Placing an Outside Call

The two outside lines $L_1$ and $L_2$ of the embodiment in FIG. 4 appear at buttons 207 and 208, respectively, of the station set $N_1$ and at corresponding buttons in each of the other station sets $N_2$–$N_4$. These buttons are illuminated conventionally by lamps 401 and 402 under the control of the respective line circuits $KTU_1$ and $KTU_2$ when the lines associated with them are in use. To place an outside call, the user depresses an outside line button such as button 207 that is not illuminated and goes off-hook. This action connects the A lead to ground and presents the tip T and the ring lead R of line $L_1$ to the privacy circuit PC (FIG. 3). Grounding the A lead causes the line circuit $KTU_1$ to illuminate the lamp 401. At the same instant, the privacy circuit PC detects that the line is not in use and connects it through to the rest of the station set, specifically to the hybrid network and handset 303 shown in FIG. 3. At that point current begins to flow through the tip and ring circuit of the line $L_1$ and the line is recognized as being in use. If the user goes off-hook on a line already in use, the privacy circuit PC detects a busy condition and does not connect the line through to the rest of the station set. Additionally, by means subsequently described herein, the busy lamp 204 of the station set would be illuminated.

Receiving an Outside Call

A station set may or may not have its ringer connected across the tip and ring of an outside line. When an incoming call is detected, the line circuit causes the lamp in the button associated with that line to flash. Any station may answer the incoming call by depressing the button associated with that line and going off-hook. The privacy circuit PC then connects the line through to the rest of the station set $N_1$. Any other station set subsequently going off-hook on that line will be unable to access that same line and additionally will receive a busy indication.

Holding an Outside Call

Once an outside call is in progress, the station on that line may put it on HOLD by depressing the HOLD button 206, FIG. 2. This action momentarily disconnects the A lead from ground. The line circuit then holds the line and causes the lamp 401 to wink. Any station may now pick up that line but any other station would then be excluded in any subsequent attempt to gain access to the same line.

Transferring an Outside Call to Another Station

An outside call is transferred by putting that line on HOLD and then informing the proper party in the system via this intercom line or by any other means that he should pick up the line that is on HOLD. After the signaled station picks up the line, any other station will be excluded in any subsequent attempt.

Placing an Intercom Call

The user depresses the DSS button associated with the desired party and goes off-hook. This action presents the tip and ring of that party to the privacy circuit PC. A called party is considered "busy" if he has been called on his intercom. If he is using his telephone for an outside call, however, or has initiated an intercom call to another party, his line is not considered busy. As a result, a user has the option of not answering or temporarily abandoning his other party to answer his own line. If the called party is busy, then the privacy circuit PC does not connect through and a busy indication is given. If the called party is not busy, however, the privacy circuit is connected through to that line. Depressing the signal button 205 grounds the S lead. This action causes the corresponding line circuit to sound the called party's buzzer and illuminates the lamp in his ANSWER button 215.

Answering an Intercom Call

When a station is signaled by the intercom buzzer 301 and by the light 304, the call is answered by depressing the ANSWER button 215 and going off-hook.

Forming a Conference Call

A subscriber may bridge his ANSWER line to whatever other line he has depressed by twisting his conference button 205. Thus another internal party may be added to a call already in progress by calling that party and instructing him to turn his conference button 205 and to pick up the previous caller. Moreover, still another party may be added on by calling him and instructing him to pick up the previously added-on party and so on.

Privacy Circuit

As indicated above, the privacy circuit PC is essentially a voltage-sensitive switch that completes the transmission path between the telephone line and a station set. Direct current potentials on a telephone line are usually low or high, depending upon whether the line is in use. If a line is not in use, the voltage at any station set appearance of that line is high, typically 48 volts, while the station set voltage of a line in use is typically less than 10 volts. In sensing these large voltage variations, the privacy circuit functions to connect or exclude the station set from the monitored line, completing a connection when the line voltage is high and failing to complete a connection when the voltage is low. Once a circuit completion occurs, the line voltage drops but the privacy circuit remains fired.

In the following detailed description of the privacy circuit shown in FIG. 5, it is assumed that the user has accessed an available outside line and has gone off-hook. Accordingly, the voltage $E_{TR}$ at the terminals T and R is 48 volts. A group of four series connected voltage surge protectors $CR_2$, $CR_3$, $CR_4$ and $CR_5$ are connected in shunt across the T and R terminals. As a result, if the voltage $E_{TR}$ exceeds some preselected level such as 80 volts d.c., for example, the surge protectors break down which limits the voltage applied to the rest of the circuit. Under normal conditions, the surge protectors have no effect, however, and the 48 volts d.c. is applied to a bridge rectifier CR1 which ensures that the proper voltage polarity is applied to the rest of the circuit. The bridge rectifier output voltage $E_{AD}$ is then approximately 46 volts. A zener diode CR6, having a breakdown voltage of approximately 13 volts, breaks down, thereby dropping the voltage $E_{BD}$ across the series combination of resistor R4 and capacitor C3 to 33 volts. Since the voltage across capacitor C3 is at this point zero, transistor Q1 is cut off and capacitor C3 starts to charge to 33 volts through resistor R4. The voltage across the capacitor C3 ($E_{CD}$) then becomes the source of gate current for a pair of PNPN switches Q2 and Q3. Illustrative characteristics for these PNPN devices are as follows:

| | |
|---|---|
| Breakover voltage | 200 volts d. c. |
| Gate current for turnon ($I_{gk}$) | 10 $\mu$a |
| Gate voltage for turnon ($E_{gk}$) | 0.4 volt |
| Holding current | 2.0 ma |
| Gate-cathode voltage (device conducting) | 0.7 volt. |

The gate circuit being driven by the voltage $E_{CD}$ consists of the series connection of the gate-cathode of the PNPN devices Q2 and Q3, the diode CR9 and the resistor R6. With PNPN devices of the characteristics indicated, the voltage $E_{CD}$ must reach a level of approximately 9.0 volts. The time required for the capacitor C3 to charge to that level through the resistor R4, however, is o the order of 125 milliseconds and, accordingly, a delay of that magnitude is introduced between off-hook time and the time that a talking path through the privacy circuit is completed. In accordance with the invention, this delay is introduced to ensure that the privacy feature cannot be comprised. Without this delay, an excluded party may interrupt dial pulses and steal the line if he goes off-hook while the entitled party is dialing. Additionally, voltage surges on the line which may be caused by switchhook flashes, dial pulses or outside forces such as lightning, for example, momentarily bring low line voltage up to that of the battery voltage. In such cases if the privacy circuit were to act instantaneously, it would be unable to distinguish between an on-hook condition and a switchhook flash, a dial pulse or other momentary voltage surge. With a suitable delay, however, such as 125 milliseconds, dial pulses, which typically have a duration of 60 milliseconds, and other such brief voltage peaks cannot adversely effect privacy circuit operation.

One feature of the invention that distinguishes the privacy circuit of FIG. 5 from prior art privacy circuits is the exceptionally high level of exclusion that is achieved. This increased exclusion is attained by opening both sides of the line rather than only one side so that sound levels from an excluded line at the network of a connected telephone set are on the order of −95 to −100 VU, which is below the threshold of audibility.

When the voltage at the T and R terminals goes to zero for any reason such as switchhook or key operation, the privacy circuit immediately releases, which is to say that Q2 and Q3 no longer conduct. Also, since the voltage $E_{BD}$ drops to zero with capacitor C3 charged, transistor Q1 turns on, discharging capacitor C3 very quickly. A fast release and a nearly complete instantaneous discharge of capacitor C3 are necessary to prevent line stealing by unorthodox key manipulation.

In addition to its effect in improving attenuation during exclusion, the presence of the PNPN device Q3, together with its associated circuitry including resistors R5 through R8 and the capacitor C5, eliminates the possibility of establishing a "race condition" between station sets. A race condition exists when two station sets are vying for the same line. Such a condition becomes undesirable when one of the two stations is entitled to the contested line by virtue of dialing first, for example.

Figure 6:
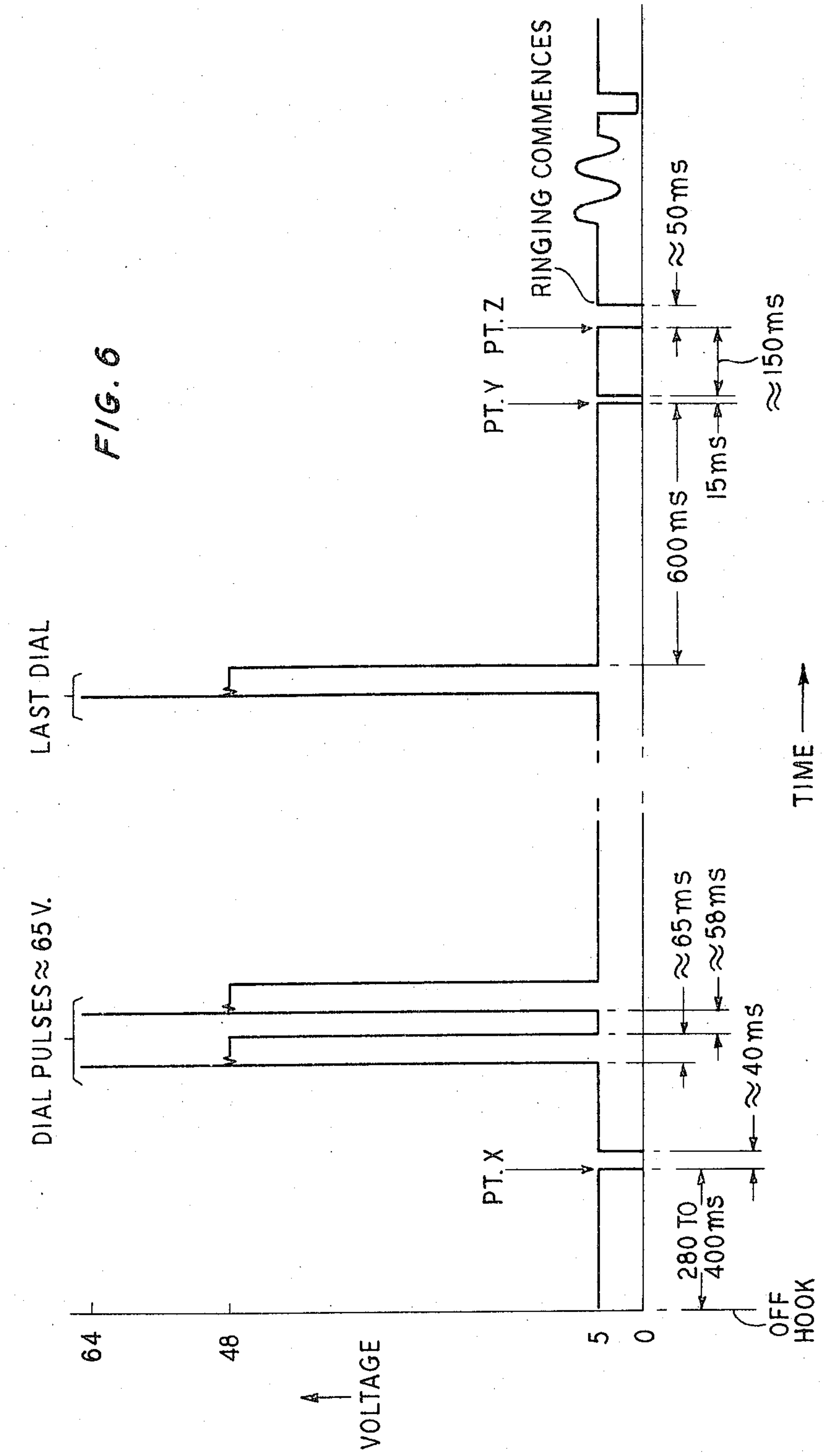
FIG. 6 is a plot of waveforms present on a telephone line during battery removals and dialing.

FIG. 6, which is a plot of the d.c. levels across tip and ring as seen from a central office, gives some insight as to how an undesirable race condition may be established. The typical sequence illustrated in FIG. 6 commences with an off-hook condition and proceeds through the dialing operation to the commencement of ringing. It will be noted that the central office in this example drops battery during the described sequence a total of three times. As a result, open battery intervals occur once before dial tone is applied at time X and twice between the last dial pulse and ringing at times Y and Z. As described above, whenever battery is removed either by switchhook, by key or at the central office, the privacy circuit releases and capacitor C3 discharges. When battery is reapplied to the central office, the privacy circuit is required to "time-in" once again. Another station set may go off-hook on that same line, however, before battery is reapplied. If the second set, owing to normal component tolerances for example, has a slightly faster acting privacy circuit, it will seize the contested line thereby excluding the first or entitled user. This condition is of no particular importance if it occurs at time X since the normally entitled user would not receive dial tone. It is clearly undesirable however when the same condition arises at time Y or Z when a user has been given access to a line and has dialed out. In that event, if a nonentitled or second user with a faster privacy circuit accesses the same line between times X and Y, then, upon reapplication of battery at time Z, the entitled or first user is cut off and the nonentitled user is connected to the dialed party.

The problem of race conditions described above is avoided in accordance with the invention by PNPN switch Q3 and its associated circuitry which, in effect, provides a "head start" for the entitled set. As described above, before PNPNs Q2 and Q3 can turn on, the voltage across the capacitor C3, $E_{CD}$, must reach some preselected level such as 9.0 volts, for example. The attainment of this voltage is necessary since the gate current of PNPNs Q2 and Q3 must flow through the cathode-gate diodes of these devices as well as through the resistor R6 and the diode CR9. As described, PNPNs Q2 and Q3 turn on after 125 milliseconds to complete the transmission path to the station set. The gate-cathode voltage drop of a PNPN device of the Q2–Q3 type is typically on the order of 0.7 volts. After the initial turnon, the voltage $E_{gk}$ rises to 0.7 volts and the capacitor C5 charges to this level through the resistor R7. With any ensuing momentary open intervals, capacitor C5 discharges back through resistor R7 and the gate-cathode junction of PNPN Q3. When the voltage across capacitor C5 reaches approximately 0.5 volts, the gate-cathode junction of PNPN Q3 cannot conduct and capacitor C5 continues to discharge, but more slowly, through the resistors R5, R6 and R7.

Upon reapplication of battery, capacitor C3 charges as before. Now, however, when the voltage across capacitor C3 reaches 6.0 volts, diode CR9 conducts and current flows through the gate-cathode diodes of PNPNs Q2 and Q3, resistor R6 and diode CR9. Some current also branches through capacitor C5 and resistor R7. Capacitor C5 is already charged to just under the gate-cathode turnon voltage for PNPN Q3, e.g., approximately 0.4 volt. This condition effectively provides PNPN Q3 with a head start since the 0.4 volt turnon level of PNPN Q3 is reached more quickly than before. As soon as PNPN Q3 starts to turn on, the gate-cathode current for PNPN Q2 flows through PNPN Q3 and the low resistance (120 ohms) of the station set network. The turnon of PNPN Q2 follows immediately which completes the transmission path once again.

In summary, the faster second time-in is provided by the charge on capacitor C5 since it is only at the station wet which initially gains the line where capacitor C5 will have any charge. Any nonentitled set involved in a race condition still has a 125 millisecond delay period and, hence, cannot seize the line. Under the circumstances described, the fastest second time-in delay that can occur is on the order of 80 milliseconds. A delay of that magnitude would occur, however, only after a relatively brief battery removal, such as 50 milliseconds or less. After a relatively long battery removal, one second or longer for example, capacitor C5 is completely discharged and the circuit requires the initial 125 milliseconds to time-in. The second time-in accordingly varies from 80 milliseconds to the full delay of 125 milliseconds. Accordingly, for all reasonable or ordinary open intervals (less than one second), the circuit originally obtaining a line will retain that line.

As indicated above, the privacy circuit also operates between a selected intercom line and the station set, functioning in substantially the same fashion as described. The single difference in operation is in the delay period which on an intercom line is slower as a result of the lower line voltage which is typically on the order of 24 volts. On an intercom line therefore, the initial time-in from off-hook to connection is approximately 650 milliseconds. Race conditions do not occur in intercom operation since there are no battery removals.

As indicated in FIGS. 3 and 5, a busy indicator 204 (FIG. 3) is associated with the privacy circuit PC. Transistors Q4, Q5 and Q6 and their associated circuit components serve to ignite or extinguish a light emitting diode (LED) to signal a busy condition. Under normal nonbusy line seizure conditions when a user goes off-hook, the voltage $E_{AD}$ across the polarity guard CR1 is high so that the diode CR6 conducts and the voltage $E_{BD}$ goes positive. A portion of the $E_{BD}$ voltage is applied to the base of transistor Q6 which turns on. Transistor Q6 then quickly saturates, strapping the input to the Q4–Q5 Darlington pair, thereby keeping these transistors turned off. With transistors Q4 and Q5 off, no current flows through the LED and, accordingly, no busy indication is given.

After the transmission portion of the privacy circuit has turned on, the voltage $E_{AD}$ across the polarity guard CR1 drops to less than 10 volts. Since the zener diode CR6 cannot conduct unless its breakdown voltage of approximately 13 volts is applied thereto, the voltage $E_{BD}$ in effect tries to go to zero. If that condition in fact occurred, transistor Q6 would cut off and transistors Q4 and Q5 would turn on, igniting the busy indicator LED. The diode CR8 conducts, however, after the transmission portion of the privacy circuit times-in. This action maintains the voltage $E_{BD}$ at a level slightly below the voltage $E_{AD}$ keeping transistor Q6 turned on and hence the busy indicator LED off.

When the user goes off-hook on a line already in use, line voltage is low and the diode CR6 does not conduct and, accordingly, the voltage $E_{BD}$ is zero. As a result, transistor Q6 cannot turn on. Transistors Q4 and Q5 do turn on, however, and the LED conducts and illuminates to provide a busy indication.

The busy lamp circuit is designed to have a slow turnon and a fast turnoff, thus allowing proper time-in of the transmission section of the privacy circuit and normal dial operation thereafter. Capacitors C7 and C9 act to provide the necessary delay in busy lamp ignition.

A fast turnoff of the LED busy lamp is desirable, particularly the lamp associated with the station in use. Additionally, it is desirable to extinguish the busy lamp of one or more off-hook, nonentitled sets while the entitled user is dialing. Under normal circumstances, as explained above, an entitled user receives dial tone while a non-entitled user receives a visual busy indication. When the entitled user dials, however, it is necessary to have the busy lamp at the nonentitled user's station extinguish during the break period of dial pulses. Any sizable continuous current being drawn by the busy lamps at that time would distort the user's dial pulses. Additionally, the entitled user could lose the line under these circumstances as well as having his own busy lamp operated. Accordingly, capacitors C8 and C10 have been included to speed up the strapping effect of transistor Q6 on transistors Q4 and Q5.

It is to be understood that the embodiment described herein is merely illustrative of the principles of the invention. Various modifications thereto may be effected by persons skilled in the art without departing from the spirit and scope of the invention.

What is claimed is:

1. A key telephone system comprising, in combination, a plurality of key telephone sets each including a handset, a hybrid, and a plurality of manually operable switch appearances for outside lines and direct station selectable intercom lines, each of said sets including a respective manually operable switch appearance for a common intercom answer line whereby a calling intercom station is connected to said set by the operation of said last named switch, each of said line appearances of said outside, intercom and answer lines including a respective tip lead and ring lead, each of said sets including conferencing means including a manually operable switch for completing a connection between said answer line and any other line having an appearance at that set, means connected across said respective tip and ring leads for ensuring privacy of all calls irrespective of momentary voltage peaks or battery open intervals, and common equipment shared by all of said sets comprising key system line circuits, signaling means and local battery means.

2. Apparatus in accordance with claim 1 wherein each of said line appearances of said outside lines and of said intercom lines includes a respective signal lead extending to a first or to a second terminal, respectively, and means whereby any one of said appearances of said intercom lines may be changed to the other by changing said lead from one of said terminals to the other of said terminals with no wiring changes being required in said common equipment.

3. Apparatus in accordance with claim 1 wherein said privacy means comprises a circuit having first and second input points and first and second output points, one of said inputs being connected to said tip lead of each of said appearances with the exception of said answer lines appearance and said second input being connected to said ring lead of each of said appearances by way of a switchhook contact, one of said outputs being connected directly to said handset and hybrid of the set, said second output point being connected to said handset and hybrid by way of dial contacts, and the tip lead of said answer line being connected directly to said first output point.

4. Apparatus in accordance with claim 3 wherein said circuit interposes first solid-state switching means between said first input point and said first output point and second solid-state switching means between said second input point and said second output point.

5. Apparatus in accordance with claim 4 wherein said switches comprise PNPN devices.

6. Apparatus in accordance with claim 1 wherein said privacy means comprises means responsive to normal battery voltage at any of said appearances for completing a path from said last named appearance to said hybrid of said set after a fixed preselected time delay.

7. Apparatus in accordance with claim 6 wherein said privacy means further includes means responsive to the operation of said path-completing means followed by removal of battery from said last named appearance for a time not exceeding a preselected duration, followed by the abrupt opening of said path-completing means, followed by the return of said battery for reoperating said path-comprising means after a variable preselected time delay, the length of said last named delay being determined by the length of said last named delay being determined by the length of said last named duration but not exceeding said last named duration, thereby precluding a set from seizing a line during a brief battery removal from a set first connected to that last named line.

8. A key telephone system comprising, in combination, a plurality of key telephone sets each including a plurality of first pushbutton means for connecting to outside lines and a plurality of second pushbutton means for the direct station selection of intercom lines, common equipment including a plurality of key system line circuits, signaling means and local battery means, each of said line circuits being connected to a respective one of said pushbutton means, and each of said sets including a voice network and respective privacy circuit means including means responsive after a first fixed preselected delay to the detection of normal battery voltage on one of said lines for completing a talking path between one of said pushbutton means and said voice network of that set thereby precluding connection of a set to an already busy line as the result of sudden voltage surges or dialing pulses, said privacy circuit means further including means for closing said talking path responsive after a second variable delay to the sequence of the completion of said talking path, the opening of said path owing to the removal of battery for a period not exceeding a preselected duration and the return of said battery, the duration of said variable delay being determined by the length of said last named preselected duration but not exceeding said first fixed preselected delay.

9. Apparatus in accordance with claim 8 wherein said talking path closing means comprises first and second switch means on the tip and ring side of the line, respectively.

10. Apparatus in accordance with claim 9 wherein said first and second switch means comprise PNPN junction devices.

* * * * *